US008377634B2

(12) United States Patent
Albaugh et al.

(10) Patent No.: US 8,377,634 B2
(45) Date of Patent: Feb. 19, 2013

(54) RADIATION SENSITIVE SILICONE RESIN COMPOSITION

(75) Inventors: John Dean Albaugh, Freeland, MI (US); Gregory Scott Becker, Sanford, MI (US); Sina Maghsoodi, Midland, MI (US); Eric Scott Moyer, Midland, MI (US); Sheng Wang, Midland, MI (US); Craig Rollin Yeakle, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 1077 days.

(21) Appl. No.: 11/579,347

(22) PCT Filed: Jun. 3, 2005

(86) PCT No.: PCT/US2005/019575
§ 371 (c)(1),
(2), (4) Date: Jul. 11, 2008

(87) PCT Pub. No.: WO2006/019468
PCT Pub. Date: Feb. 23, 2006

(65) Prior Publication Data
US 2009/0004606 A1   Jan. 1, 2009

Related U.S. Application Data

(60) Provisional application No. 60/588,440, filed on Jul. 16, 2004.

(51) Int. Cl.
G03F 7/038 (2006.01)
G03F 7/075 (2006.01)
G03F 7/20 (2006.01)
G03F 7/30 (2006.01)
G03F 7/38 (2006.01)

(52) U.S. Cl. ..... 430/325; 430/311; 430/330; 430/286.1; 430/287.1; 430/916; 528/12; 528/14; 528/19; 528/21; 528/32; 528/41; 528/43; 522/2; 522/74; 522/99; 522/148; 522/172; 427/331; 427/387; 427/515

(58) Field of Classification Search .................. None
See application file for complete search history.

(56) References Cited

U.S. PATENT DOCUMENTS

| 4,092,172 A * | 5/1978 | Higuchi ................. 430/285.1 |
| 4,455,205 A | 6/1984 | Olson et al. |
| 4,562,142 A * | 12/1985 | Kakumaru et al. ....... 430/288.1 |
| 4,568,566 A | 2/1986 | Tolentino |
| 5,158,854 A * | 10/1992 | Imamura et al. ............. 430/192 |
| 5,683,501 A * | 11/1997 | Tomihisa et al. ............. 106/491 |
| 5,734,000 A | 3/1998 | Popall et al. |
| 5,738,976 A | 4/1998 | Okinoshima et al. |
| 6,136,500 A * | 10/2000 | Kobayashi et al. ......... 430/270.1 |
| 2002/0051932 A1* | 5/2002 | Brainard et al. ........... 430/270.1 |
| 2002/0098279 A1* | 7/2002 | Lyu et al. ........................ 427/58 |
| 2003/0044716 A1* | 3/2003 | Cameron et al. .......... 430/270.1 |
| 2003/0065123 A1* | 4/2003 | Lyu et al. ......................... 528/33 |
| 2003/0148226 A1* | 8/2003 | Kodama et al. ............. 430/321 |

FOREIGN PATENT DOCUMENTS

| JP | 56-151731 | 11/1981 |
| JP | 1992372614 | 12/1992 |
| JP | 05-098012 | 4/1993 |
| WO | 9909457 | 2/1999 |
| WO | WO 00-46622 | 8/2000 |
| WO | 0110871 | 2/2001 |

OTHER PUBLICATIONS

Derwent English abstract for JP4-28722 (Kaneko et al) (1992).*
Full English translation of JP4-28722 (Kaneko et al), provided by USPTO (1992).*
Full English translation of JP56-151731 (Yamazaki et al), provided by USPTO (1981).*
JP 04-028722, published Jan. 31, 1992. Abstract only.
Jeong, "Fabrication of photo-patternable inorganic-organic hybrid film by spin-coating", Thin Solid Films, 2004, pp. 204-208, vol. 466.
Abstract of KR20040029277, Saito et al., "Basket type silsesquioxane resin with functional group having controlled molecular weight distribution and molecular structure and preparation thereof", Apr. 6, 2004.

* cited by examiner

*Primary Examiner* — Sin J. Lee
(74) *Attorney, Agent, or Firm* — Erika Takeuchi

(57) ABSTRACT

This invention relates to acrylic functional resin compositions. More particularly, this invention relates to Poly [organo-(meth)acryloxyorgano]silsequioxane resins that are curable upon exposure to ultraviolet radiation with photo initiator or upon heating with or without a free radical generator. The resin compositions have high storage stability at room temperature and produces films that are useful as planarization layer, interlayer dielectric, passivation layer, gas permeable layer, negative photoresist, antireflective coating, conformal coating and IC packaging.

24 Claims, No Drawings

RADIATION SENSITIVE SILICONE RESIN COMPOSITION

CROSS REFERENCE TO RELATED APPLICATIONS

This application is a U.S. national stage filing under 35 U.S.C. §371 of PCT Application No. PCT/US05/019575 filed on 3 Jun. 2005, currently pending, which claims the benefit of U.S. Provisional Patent Application No. 60/588,440 filed 16 Jul. 2004 under 35 U.S.C. §119 (e). PCT Application No. PCT/US05/019575 and U.S. Provisional Patent Application No. 60/588,440 are hereby incorporated by reference.

This invention relates to acrylic functional resin compositions. More particularly, this invention relates to Poly[organo-co-(meth)acryloxyhyrdocarbylene]silsequioxane resins that are curable upon exposure to ultraviolet radiation with photoinitiator or upon heating with or without a free radical generator. The resin compositions have high storage stability at room temperature and produces films that are useful as planarization layer, interlayer dielectric, passivation layer, gas permeable layer and conformal coating.

The acrylic functional resin composition of this invention can be easily manufactured with high storage stability, with good sensitivity to UV curing and patterning. The acrylic functional resin composition can be thermally cured at low temperature to produce thin films with good mechanical, electrical, optical and permeability properties. The resulting thin films can be used in a variety of applications such as planarization layer, interlayer dielectric, passivation layer, negative photoresist, antireflective coating, color filter overcoat in IC and display industry.

The acrylic functional resin has the formula $$\{[(CH_2=CR^1COOR)SiO_{3/2}]_a[R^2SiO_{3/2}]_b\}n$$

where R is a hydrocarbylene having 1 to 8 carbon atoms, $R^1$ is a hydrogen atom or methyl group, $R^2$ is an alkyl, cyclic alkyl, aryl or alkenyl group having 1 to 8 carbon atoms, a is $0.05<a<0.95$, b is $0.05<b<0.95$, provided that $a+b\sim1$. Typically a is 0.3 to 0.45 and b is 0.55 to 0.7 with the provision that $a+b\sim1$. R may be exemplified by, but not limited to, methylene, ethylene, propylene, arylene groups and alkenylene groups. $R^2$ may be exemplified by, but not limited to, methyl, ethyl, propyl, hexyl, octyl, vinyl, allyl, hexenyl, cyclohexyl, 2-cyclohexylethyl, 3,3,3-trifluoropropyl, phenyl, naphthyl and the like. Typically $R^2$ is methyl, phenyl or mixtures thereof. More typically, $R^2$ is phenyl. The acrylic functional resins typically have a weight average molecular weight (Mw) of 3,000 to 100,000 g/mol in terms of polystyrene by GPC.

The acrylic functional resins can be prepared by co-hydrolyzing a trialkoxysilane having the formula $R^2Si(OR^3)_3$ or a trichlorosilane having the formula $R^2SiCl_3$ with a acryloxy functional trialkoxysilane having the formula $(CH_2=CR^1COOR)Si(OR^3)_3$ or a trichlorosilane having the formula $(CH_2=CR^1COOR)SiCl_3$), where R, $R^1$ and $R^2$ are defined as above and $R^3$ is an alkyl group having 1 to 3 carbon atoms. $R^3$ may be exemplified by methyl, ethyl and propyl. Typically $R^3$ is methyl.

Specific examples of trialkoxysilanes useful herein include, but are not limited to, methyltrimethoxysilane, ethyltrimethoxysilane, methyltriethoxysilane, ethyltriethoxysilane, phenyltrimethoxysilane, and phenyltriethoxysilane.

Specific examples of acryloxy functional trialkoxysilanes, include but are not limited to, acryloxypropyltrimethoxysilane, acryloxypropyltriethoxysilane, (2-methyl) acryloxypropyltrimethoxysilane, and (2-methyl) acryloxypropyltriethoxysilane.

Typically, the co-hydrolysis of the alkoxysilanes is carried out in the presence of a base catalyst. Usable base catalysts include conventionally known inorganic bases and organic bases. An inorganic and organic base such as potassium hydroxide (KOH), cesium hydroxide (CsOH), ammonium hydroxide ($NH_4OH$), tetramethyl ammonium hydroxide (TMAH), tetrabutylammonium hydroxide (TBAH), and phosphazene bases, e.g. Phosphazene Base $P_4$-t-Bu solution, among them preferred is TMAH. The amount of base catalyst used is typically 0.001 to 1.00 parts by weight per 100 parts by weight of the total amount of alkoxysilanes. Typically the co-hydrolysis reaction is carried out at 60° C. to 80° C.

Each of the alkoxysilane components in the co-hydrolysis may be employed in such an amount that the amount of the trialkoxysilane having the formula $R^2Si(OR^3)_3$ is 50 to 75 mole %, alternatively 55 to 70 mole % based on the total moles of alkoxysilanes (trialkoxysilane and acryloxy functional trialkoxysilane) used.

Thin films may be produced from the acrylic functional resin by applying the resin to a substrate and thereafter curing the applied resin. The resulting films typically have a thickness of 1-10 μm with excellent mechanical, electrical, optical properties that are chemically resistant to solvents, acids and bases.

The acrylic functional resins may be applied to the substrate in a solvent solution. Specific methods for application of the acrylic functional resin include, but are not limited to, spin coating, extrusion coating, dip coating, spray coating, flow coating, screen-printing and others. Typically the acrylic functional resins are applied by spin coating. When a solvent is used, the solvent is allowed to evaporate from the coated substrate resulting in a deposition of an acrylic functional resin film. Any suitable means for evaporation may be used such as air-drying by exposure to an ambient environment, by the application of vacuum, mild heat or during the early stages of the curing process. When spin coating is used as the application means, the additional solvent evaporation step is minimized as the spinning drives off the solvent.

The choice of solvent is governed by many factors such as the solubility and miscibility of the resin and additives, the coating process and the safety and environmental regulations. Typical solvents include ether-, ester-, hydroxyl- and ketone-containing compounds. Examples of solvents include, but are not limited to, cyclohexanone, cyclopentanone, lactate esters, alkylene glycol alkyl ether esters such as propylene glycol methyl ether acetate (PGMEA), methyl isobutyl ketone (MIBK), ethyl lactate (EL), methyl ethyl ketone (MEK), 2-heptanone, (or MAK) or 3-methoxy-3 methyl-1-butanol (MMB) and/or any mixtures of above solvents. The amount of solvent used is typically 40 to 90 wt % based on the weight of the solution, alternatively the amount of solvent used is typically 50 to 70 wt %.

The acrylic functional resins produced herein can be cured thermally. Typically temperatures of 100° C. to 300° C. are used in the curing. Any environment may be used during the cure. Suitable environments include, but are not limited to, nitrogen, air, oxygen, helium, argon or combinations thereof. However it is preferred to use an essentially inert environment such as nitrogen during the cure.

Alternatively the acrylic functional resins can be formulated with free radical initiators and cured by heating to a temperature in the range of 100° C. to 150° C. Examples of free radical initiators are peroxides such a dibenzoyl peroxide (BPO), bis-p-chlorobenzoyl peroxide, bis-2, 4-dichlorobenzoyl peroxide, di-t-butyl peroxide, dicumyl peroxide, t-butyl perbenzoate, 2,5-bis(t-butylperoxy)-2, 3-dimethylhexane and t-butyl peracetate; benzophenones; acetophenones; azodi (1,1-hexahydrobenzonitrile); azobisisobutyronitrile (AIBN); α-α-bis tertiary peroxydiisopropylbenzene and others.

The amount of free radical initiator to be used should be sufficient to induce crosslinking of the acrylic functional resin upon exposure to heat. Typically the amount is 0.01 to 1.0 moles of initiator per mole of acrylic functional resin, alternatively 0.1 to 1 mole of initiator per mole of acrylic functional resin.

Alternatively, the acrylic functional resins can be formulated with photoinitiator such as IRGACURE 819 (Ciba Speciality Chemicals) and UV cured or UV patterned photopatterned ("photocured" or "photopatterned").

Other additives such as surfactants, cross-linking agents, sensitizers, coating aids, plasticizers and adhesion promoters may be added to the acrylic functional resin so long at they are not detrimental to the cure of the resin. The amount of additive will depend on the type and function of the additive. One skilled in the art will be able to readily determine the amount of additive based on the type and function of the additive. Typical amounts are 0.01 wt % to 20 wt % based on solids.

For photocuring and photopatterning, a solution comprising (A) the acrylic functional resin; (B) photoinitiator and (C) solvent is used. Examples of the photoinitiator (B) include, but are not limited to, alpha-hydroxy ketone; phenylglyoxylate; benzildimethylketal; alpha-aminoketone; mono acyl phosphine; bis acyl phosphine; benzoin ether; benzoin isobutyl ether; benzoin isopropyl ether; benzophenone; benzoylbenzoic acid; methyl benzoylbenzoate; 4-benzoyl-4'-methyldiphenyl sulfide; benzylmethylketal; 2-n-butoxyethyl-4-dimethylaminobenzoate; 2-chlorothioxanthone; 2,4-diethylthioxanthanone; 1-hydroxy-cyclohexyl-phenyl-ketone (IRGACURE 184—Ciba Specialty Chemicals), methylbenzoylformate; phenyl bis(2,4,6-trimethyl benzoyl)-phosphine oxide (IRGACURE 819-Ciba Specialty Chemicals). These photoinitiators can be used alone or in the mixture thereof. The amount photoinitiator used in the solution is 0.1 to 20 wt %, alternatively 1 to 10 wt % based on the weight of the solution.

In a typical UV curing process, a UV radiator tool is utilized, which is first purged with nitrogen or argon to allow the UV radiation to enter the process chamber with minimal spectral absorption. The process chamber is purged separately and process gases, such as $O_2$, $N_2$, $H_2$, Ar, He, $C_xH_y$, air, and mixtures thereof, may be utilized for different applications. UV generating bulbs with different spectral distributions may be selected depending on the application. The wafer temperature may be controlled ranging from room temperature to 450° C., and the process pressure can be less than, greater than, or equal to atmospheric pressure. The UV power is typically >0 mW/cm$^2$ to 1000 mW/cm$^2$ and the UV wavelength it typically a continued spectral distribution from 150-800 nm. Typically the UV process is carried out for less than 300 seconds. One skilled in the art will be able to determine the precise conditions that will cure the acrylic functional resin.

The method for generating a patterned film typically comprises applying to the substrate a composition comprising the acrylic functional resin, photoinitiator, and solvent. The film is heated to a temperature of 50° C. to 150° C. to "pre-bake" the film. A photomask is applied over the pre-baked film and the photomask is exposed to UV radiation to produce a partially exposed film having non-exposed regions covered by the photomask. The resulting partially exposed film is heated ("post-exposure-bake") for an amount of time such that the exposed regions are substantially insoluble in a developing solvent and the non-exposed regions are soluble in a developing solvent. After the post-exposure-bake, the non-exposed regions are removed by rinsing with a developing solvent to form a patterned film that corresponds to the negative of the photomask.

Developing solvents useful herein include alcohols, ketones, aromatic hydrocarbons, alkanes, ethers, esters and mixtures thereof.

Poly(phenyl-co-(meth)acryloxypropyl)silsesquioxanes were synthesized by co-hydrolyzing phenyltrimethoxysilane and 3-acryloxypropyltrimethoxysilane or 3-methacryloxypropyltrimethoxysilane. 29Si NMR results show that the resins prepared via this route were well condensed with less than 3 mol % residual silanols. 13C NMR results indicated that both 3-acryloxypropyl and 3-methacryloxypropyl groups remained intact. MALDI-TOF mass spectrometric results showed the presence of small amount of low molecular weight single cages such as T8, T10, and T12 (n=4-7). No significant molecular weight increases were detected by GPC after the bulk resins were stored in a refrigerator at 5° C. for a year, indicating that the resins have excellent stability. These resins are very soluble in common organic solvents such as toluene, chloroform, methylisobutylketone (MIBK), and propyleneglycolmethylether acetate (PGMEA). The resin solutions could be spin coated onto a silicon wafer to yield high quality thin films. The high quality thin films can be cured in the presence of a photoinitiator at ambient temperature or in the presence of a thermal initiator at temperatures higher than 80° C. The cured films show high modulus, good adhesion, and low dielectric constants ($k \leq 3.5$)

The following examples are provided to further describe the present invention. The invention is not limited to the details of the examples.

All reactions were carried out in a mixture of nitrogen and air atmosphere at a approximate volume ratio of 5:1.

Gel Permeation Chromatography (GPC)

Molecular weights and molecular weight distribution were carried out at 30° C. with a Waters 2690 Separation instrument using Polymer Labs P1 Gel Mixed D columns 2×(300 mm×50 mm). Analyses were carried out in tetrahydrofuran (THF). A triple detection (3D) technique was used to determine absolute molecular weights. The 3D technique utilized light scattering, viscosity, and differential refractive index detectors.

EXAMPLE 1

Synthesis of Poly(phenyl-co-3-acryloxypronyl)silsesquioxane: $T(Ph)_{0.67}T(acryloxy Propyl)_{0.33}$ 80 g of toluene, 0.20 mol of 3-acryloxypropyltrimethoxysilane, 0.40 mol of phenyltrimethoxysilane, 2.40 mol of water, 1 g of CsOH aqueous solution (50 wt %), 200 g of methanol, and 40 mg of 2,6-di-tert-butyl-4-methylphenol were added to a flask. The solution was refluxed for 1 hour under stirring, during which about 250 g of solvent (mainly methanol) was removed. More solvent was removed while equal amount of toluene was added to keep a constant resin concentration. After most of the methanol was removed, the solution became cloudy. Solvent was continuously removed and the solution became clear again when most of the water was removed. The temperature was slowly raised to about 105° C. in about 1 hour. The resulting clear resin solution was cooled.

The resulting clear resin was diluted to about 15 wt % by adding about 230 g of toluene. 0.4 g of acetic acid was then added and the mixture was stirred for 0.5 hour. The mixture was washed 3 times with 100 ml of deionized water. The mixture was filtered, toluene was removed through a rotary evaporator at 50° C. and the solid resin was further dried over vacuum at ambient temperature for 2 hours.

EXAMPLE 2

Synthesis of Poly(phenyl-co-3-methacryloxypropyl) silsesquioxane: $T(Ph)_{0.67}T(\text{methacryloxy Propyl})_{0.33}$ 80 g of toluene, 0.20 mol of 3-methacryloxypropyltrimethoxysilane, 0.40 mol of phenyltrimethoxysilane, 2.40 mol of water, 1 g of CsOH aqueous solution (50 wt %), 200 g of methanol, and 40 mg of 2,6-di-tert-butyl-4-methylphenol were added to a flask. The solution was heated to reflux for 1 h under stirring during which 250 g of solvent (mainly methanol) was removed. More solvent was removed while equal amount of toluene was added to keep a constant solid concentration. After most of the methanol was removed, the solution became cloudy. The solvent was continuously removed and the solution became clear again when most of the water was removed. The temperature was slowly raised to about 105° C. in about an hour. The resulting solution was cooled down.

The resulting solution was diluted to about 15 wt % by adding about 230 g of toluene. 3 g of acetic acid and the mixture was stirred for 0.5 hour. The mixture was washed with 100 ml of deionized water for 3 times. The mixture was filtered through a 1 micron filter paper. Toluene was removed through a rotary evaporator at 50° C. and the solid resin was further dried over vacuum at ambient temperature for 2 hours. A resin having Mw of 15,000 in 95% yield was obtained.

EXAMPLE 3

Photosensitive Formulation

The poly(phenyl-co-3-acryloxypropyl)silsesquioxane prepared in Example 1 and the poly(phenyl-co-3-methacryloxypropyl)silsesquioxane prepared in Example 2 were dissolved in PGMEA and 10 weight percent (based on the weight of the resin) of photoinitiator, IRGACURE 819— Ciba Specialty Chemicals, was added and mixed well to produce a clear homogeneous solution. The resin solution was filtered through a 0.2 micron filter. About 2 ml of filtered solution was placed onto a clean silicon wafer staying on a spincoater. The film was obtained by spinning at 3,000 rpm for 20-30 seconds. The spin-coated film was prebaked by heating for 1 minute at a temperature of 100° C., the photomask was overlaid and exposure to UV light was carried out using homogeneous irradiation UV light source. When the silicon wafer was thereafter washed with mesitylene and dried, a precise pattern was obtained in the resin that corresponded to a negative of the photomask.

EXAMPLE 4

Thin Film Preparation and Curing

The resin produced in Example 2 was dissolved in PGMEA and MIBK to get two 25 wt % solutions. In Examples 4-4 to 4-14 a photoinitiator was added into each solution in an amount shown in Table 1. The solution was filtered through a 0.2 Micron filter. About 2 ml of filtered solution was placed onto a clean silicon wafer staying on a spincoater. The film was obtained by spinning at 3,000 rpm for 1 min. Conditions used for curing are listed in Table 1.

In Examples 4-1 to 4-6 the films were cured by applying heat.

In Examples 4-7 to 4-14 the films were UV cured by passing through a UV source for 30 seconds.

Thin film studies show that the materials have very good adhesion, high modulus, low k and excellent optical transparency as listed in Table 1.

TABLE 1

Properties of the poly(phenyl-co-3-methacryloxypropyl)silsesquioxane at various cure conditions.

| Example | Cure Conditions | k | E (GPa) | H (GPa) | Adhesion (MPa) |
|---|---|---|---|---|---|
| 4-1 | 250° C./1 hr/$N_2$ | 3.39 | 2 | 0.09 | 29.48 |
| 4-2 | 300° C./10 min/$N_2$ | 2.95 | 2.4 | 0.16 | |
| 4-3 | 300° C./10 min/Air | 3.02 | 2.7 | 0.22 | 21.33 |
| 4-4 | 200° C./10 min/Air 10% photoinitiator A | 3.5 | 3.6 | 0.11 | 8.84 |
| 4-5 | 300° C./10 min/Air 10% photoinitiator A | 3.32 | 3.1 | 0.15 | 32.64 |
| 4-6 | 300° C./10 min/Air 5% photoinitiator A | — | 2.3 | 0.09 | 21.4 |
| 4-7 | H-bulb 3024 mJ/$cm^2$ 5% photoinitiator A | — | 4.6 | 0.2 | 24.92 |
| 4-8 | H-bulb 3891 mJ/$cm^2$ 7% photoinitiator A | 3.31 | 4.9 | 0.2 | 25.51 |
| 4-9 | H-bulb 1290 mJ/$cm^2$ 10% photoinitiator A | — | 5.6 | 0.21 | 38.87 |
| 4-10 | H-bulb 1159 mJ/$cm^2$ 10% photoinitiator A | 3.23 | 3 | 0.16 | 29.56 |
| 4-11 | H-bulb 1159 mJ/$cm^2$ 10% photoinitiator A 250° C./1 hr/$N_2$ | 3.24 | 3.1 | 0.16 | 29.08 |
| 4-12 | H-bulb 800 mJ/$cm^2$ 5% photoinitiator A 250° C./1 hr/$N_2$ | 3.38 | 3.3 | 0.21 | |
| 4-13 | H-bulb 1428 mJ/$cm^2$ 5% photoinitiator B | 3.23 | 5.1 | 0.18 | 29.9 |
| 4-14 | H-bulb 800 mJ/$cm^2$ 5% photoinitiator B | 3.4 | 3.1 | 0.19 | |

EXAMPLE 5

Synthesis of Poly(phenyl-co-3-methacryloxyprolyl) silsesquioxanes $T(\text{Phenyl})_{0.90}T(\text{methacryloxy Propyl})_{0.10}$ 100 g of toluene, 0.08 mol of 3-methacryloxypropyltrimethoxysilane, 0.72 mol of phenyltrimethoxysilane, 3.2 mol of water, 1 g of TMAH, 267 g of methanol, and 50 mg of 2,6-di-tert-butyl-4-methylphenol were added to a flask. The solution was heated to reflux for 2 hour under stirring during which the solvents (mainly methanol) were removed. More solvent was removed while equal amount of toluene was added to keep a constant solid concentration. After most of the methanol was removed, the solution became cloudy. The solvent was continuously removed and the solution became clear again when most of the water was removed. The temperature was slowly raised to about 105° C. in about an hour. The resulting solution was cooled down.

The resulting solution was diluted to about 15 wt % by toluene. 0.13 g of acetic acid was added to the mixture and stirred for 0.5 h. The mixture was washed 3 times with 100 ml of deionized water. The mixture was filtered through a 1 micron filter paper. Toluene was removed through a rotary evaporator at 50° C. and the solid resin was further dried over vacuum at ambient temperature for 2 hours. A white solid resin with Mw of 8,200 in 93% yield was obtained.

EXAMPLE 6

Synthesis of Poly(phenyl-co-3-methacryloxypropyl) silsesquioxane: T(Phenyl)$_{0.50}$ T(methacryloxy Propyl)$_{0.50}$ 50 g of toluene, 0.27 mol of 3-methacryloxypropyltrimethoxysilane, 0.27 mol of phenyltrimethoxysilane, 2.18 mol of water, 0.54 g of TMAH, 170 g of methanol, and 16 mg of 2,6-di-tert-butyl-4-methylphenol were added to a flask. The solution was heated to reflux for 2 hours under stirring during which ~155 g of solvent (mainly methanol) was removed. More solvent was removed while equal amount of toluene was added to keep a constant solid concentration. After most of the methanol was removed, the solution became cloudy. The solvent was continuously removed and the solution became clear again when most of the water was removed. The temperature was slowly raised to about 105° C. in about an hour. The resulting solution was cooled down.

The resulting solution was diluted to about 15 wt % by adding toluene. 0.2 g of acetic acid was added and the mixture was stirred for 0.5 h. The mixture was washed 3 times with 100 ml of deionized water. The mixture was filtered through a 1 micron filter paper. Toluene was removed through a rotary evaporator at 50° C. and the solid resin was further dried over vacuum at ambient temperature for 2 hours. A white solid with Mw of 12,000 in 96% yield was obtained.

EXAMPLE 7

In this example, Poly(phenyl-co-3-methacryloxypropyl) silsesquioxanes T(Ph)$_{0.67}$ T(methacryloxy propyl)$_{0.33}$ were used for stability studies at different temperatures and with and without additives. The results are shown in the following Table 2:

TABLE 2

GPC based shelf life results of 30% T(Ph)$_{0.67}$ T(methacryloxy propyl)$_{0.33}$ in PGMEA

| | | Weight average molecular weight (Mw) of 30 wt % solution of T(Ph)$_{0.67}$ T(methacryloxypropyl)$_{0.33}$ in PGMEA | | | | | | | | |
|---|---|---|---|---|---|---|---|---|---|---|
| Additive | Condition | Initial | Week 1 | Week 2 | Week 3 | Week 4 | Week 5 | Week 6 | Week 7 | Week 8 |
| None | 25° C. | 8294 | 7932 | 7978 | 7985 | 8180 | 8660 | 8970 | 9290 | 9540 |
| None | 5° C. | 8294 | 8102 | 8076 | 7843 | 7834 | 7970 | 7840 | 7940 | 7870 |
| Ingacure 819 | 25° C. | 8090 | 8050 | 7760 | 7600 | 7730 | 7590 | 7470 | 7360 | |
| Darocure 4265 | 25° C. | 8315 | 8153 | 8076 | 7992 | 7878 | 7780 | 7460 | 7490 | 7290 |

What is claimed is:

1. A method of preparing an acrylic functional resin comprising co-hydrolysis and subsequent condensation of
   (I) a trialkoxysilane having the formula $R^2Si(OR^3)_3$; where $R^2$ is selected from a linear or branched alkyl, aryl or alkenyl group having 1 to 8 carbon atoms and $R^3$ is an alkyl group having 1 to 3 carbon atoms, with
   (II) an acryloxy functional trialkoxysilane having the formula $(CH_2=CR^1COOR)Si(OR^3)_3$ where $R^1$ is hydrogen or methyl group, R is a hydrocarbylene group having 1 to 8 carbon atoms and $R^3$ is an alkyl group having 1 to 3 carbon atoms,
   in the presence of base catalyst, wherein the co-hydrolysis is carried out in the presence of base catalyst.

2. The method as claimed in claim 1 wherein co-hydrolysis and subsequent condensation is carried out at a temperature in the range of 60° C. to 80° C.

3. The method as claimed in claim 1 wherein the base catalyst is selected from potassium hydroxide, cesium hydroxide and tetramethyl ammonium hydroxide.

4. The method as claimed in claim 1 wherein the base catalyst is present in an amount of 0.001 to 1.00 part by weight per 100 parts by weight of the total amount of alkoxysilanes (I) and (II).

5. The method as claimed in claim 1 wherein there is additionally present a solvent.

6. A method as claimed in claim 5 wherein the solvent is selected from alcohols, aromatic hydrocarbons and alkanes.

7. The method as claimed in claim 1 wherein there is 5 to 95 moles of trialkoxysilane (I) based on the total of 100 moles of (I) and (II).

8. The method as claimed in claim 1 wherein there is 5 to 95 moles of trialkoxyacrylic functionalsilane (II) based on the total of 100 moles of (I) and (II).

9. A process for producing a thin film comprising
   (i) preparing an acrylic functional resin comprising co-hydrolysis and subsequent condensation of
      (I) a trialkoxysilane having the formula $R^2Si(OR^3)_3$; where $R^2$ is selected from a linear or branched alkyl, aryl or alkenyl group having 1 to 8 carbon atoms and $R^3$ is an alkyl group having 1 to 3 carbon atoms, with
      (II) an acryloxy functional trialkoxysilane having the formula $(CH_2=CR^1COOR)Si(OR^3)_3$ where $R^1$ is hydrogen or methyl group, R is a hydrocarbylene group having 1 to 8 carbon atoms and $R^3$ is an alkyl group having 1 to 3 carbon atoms,
   in the presence of base catalyst, wherein the co-hydrolysis is carried out in the presence of base catalyst;
   (ii) applying to a substrate the acrylic functional resin; and
   (iii) curing the acrylic functional resin.

10. The process as claimed in claim 9 wherein the thin film has a thickness of 0.1 to 10 micrometers.

11. A process for producing a thin film comprising
   (i) preparing an acrylic functional resin comprising co-hydrolysis and subsequent condensation of
      (I) a trialkoxysilane having the formula $R^2Si(OR^3)_3$; where $R^2$ is selected from a linear or branched alkyl, aryl or alkenyl group having 1 to 8 carbon atoms and $R^3$ is an alkyl group having 1 to 3 carbon atoms, with
      (II) an acryloxy functional trialkoxysilane having the formula $(CH_2=CR^1COOR)Si(OR^3)_3$ where $R^1$ is hydrogen or methyl group, R is a hydrocarbylene group having 1 to 8 carbon atoms and $R^3$ is an alkyl group having 1 to 3 carbon atoms,
   in the presence of base catalyst, wherein the co-hydrolysis is carried out in the presence of base catalyst;

(ii) applying to a substrate a solution comprising a solvent and the acrylic functional resin;
(iii) removing the solvent; and
(iv) curing the acrylic functional resin.

12. The process as claimed in claim 11 where the solution is applied by spin coating.

13. The process as claimed in claim 11 wherein the acrylic functional resin is cured by heating.

14. The process as claimed in claim 11 wherein the thin film has a thickness of 0.1 to 10 micrometers.

15. A process for producing a thin film comprising
(i) preparing an acrylic functional resin comprising co-hydrolysis and subsequent condensation of
  (I) a trialkoxysilane having the formula $R^2Si(OR^3)_3$; where $R^2$ is selected from a linear or branched alkyl, aryl or alkenyl group having 1 to 8 carbon atoms and $R^3$ is an alkyl group having 1 to 3 carbon atoms, with
  (II) an acryloxy functional trialkoxysilane having the formula $(CH_2=CR^1COOR)Si(OR^3)_3$ where $R^1$ is hydrogen or methyl group, R is a hydrocarbylene group having 1 to 8 carbon atoms and $R^3$ is an alkyl group having 1 to 3 carbon atoms,
in the presence of base catalyst, wherein the co-hydrolysis is carried out in the presence of base catalyst;
(ii) applying to a substrate a solution comprising (a) a solvent, (b) a free radical initiator and (c) the acrylic functional resin;
(iii) removing the solvent; and
(iv) curing the acrylic functional resin.

16. The process as claimed in claim 15 wherein the free radical initiator is benzoyl peroxide.

17. The process as claimed in claim 15 wherein the acrylic functional resin is cured by heating.

18. The process as claimed in claim 15 wherein the thin film has a thickness of 0.1 to 10 micrometers.

19. A process for producing a thin film comprising
(i) preparing an acrylic functional resin comprising co-hydrolysis and subsequent condensation of
  (I) a trialkoxysilane having the formula $R^2Si(OR^3)_3$; where $R^2$ is selected from a linear or branched alkyl, aryl or alkenyl group having 1 to 8 carbon atoms and $R^3$ is an alkyl group having 1 to 3 carbon atoms, with
  (II) an acryloxy functional trialkoxysilane having the formula $(CH_2=CR^1COOR)Si(OR^3)_3$ where $R^1$ is hydrogen or methyl group, R is a hydrocarbylene group having 1 to 8 carbon atoms and $R^3$ is an alkyl group having 1 to 3 carbon atoms,
in the presence of base catalyst, wherein the co-hydrolysis is carried out in the presence of base catalyst;
(ii) applying to a substrate a solution comprising (a) a solvent, (b) a photoinitiator and (c) the acrylic functional resin;
(iii) removing the solvent; and
(iv) curing the acrylic functional resin.

20. The process as claimed in claim 19 wherein the acrylic functional resin is cured by exposing the resin to radiation having the wavelength of from 150 to 800 nm.

21. The process as claimed in claim 19 wherein the thin film has a thickness of 0.1 to 10 micrometers.

22. A process for generating a patterned film comprising:
(i) preparing an acrylic functional resin comprising co-hydrolysis and subsequent condensation of
  (I) a trialkoxysilane having the formula $R^2Si(OR^3)_3$; where $R^2$ is selected from a linear or branched alkyl, aryl or alkenyl group having 1 to 8 carbon atoms and $R^3$ is an alkyl group having 1 to 3 carbon atoms, with
  (II) an acryloxy functional trialkoxysilane having the formula $(CH_2=CR^1COOR)Si(OR^3)_3$ where $R^1$ is hydrogen or methyl group, R is a hydrocarbylene group having 1 to 8 carbon atoms and $R^3$ is an alkyl group having 1 to 3 carbon atoms,
in the presence of base catalyst, wherein the co-hydrolysis is carried out in the presence of base catalyst;
(ii) forming a film on a substrate by applying to the substrate a solution comprising (a) a solvent, (b) a photoinitiator and (c) the acrylic functional resin;
(iii) heating the film at a temperature in the range of 50° C. to 150° C. to form a prebaked film;
(iv) applying a photomask over the prebaked film;
(v) exposing the photomasked film to radiation having wavelength of from 150 to 800 nm to produce a partially exposed film having non-exposed regions covered by photomask;
(vi) heating the partially exposed film for an amount of time such that the exposed regions are substantially insoluble in a developing solvent and the non-exposed regions are soluble in the developing solvent; and
(vii) removing the non-exposed regions with a developing solvent to form a patterned film.

23. The process as claimed in claim 22 wherein the patterned film has a thickness of 0.1 to 10 micrometers.

24. The process as claimed in claim 22 wherein the developing solvent is selected from alcohols, ketones, aromatic hydrocarbons, alkanes, ethers, esters and mixtures thereof.

* * * * *